(No Model.) 2 Sheets—Sheet 1.
E. J. HAMBY.
HAND CORN PLANTER.
No. 375,286. Patented Dec. 20, 1887.
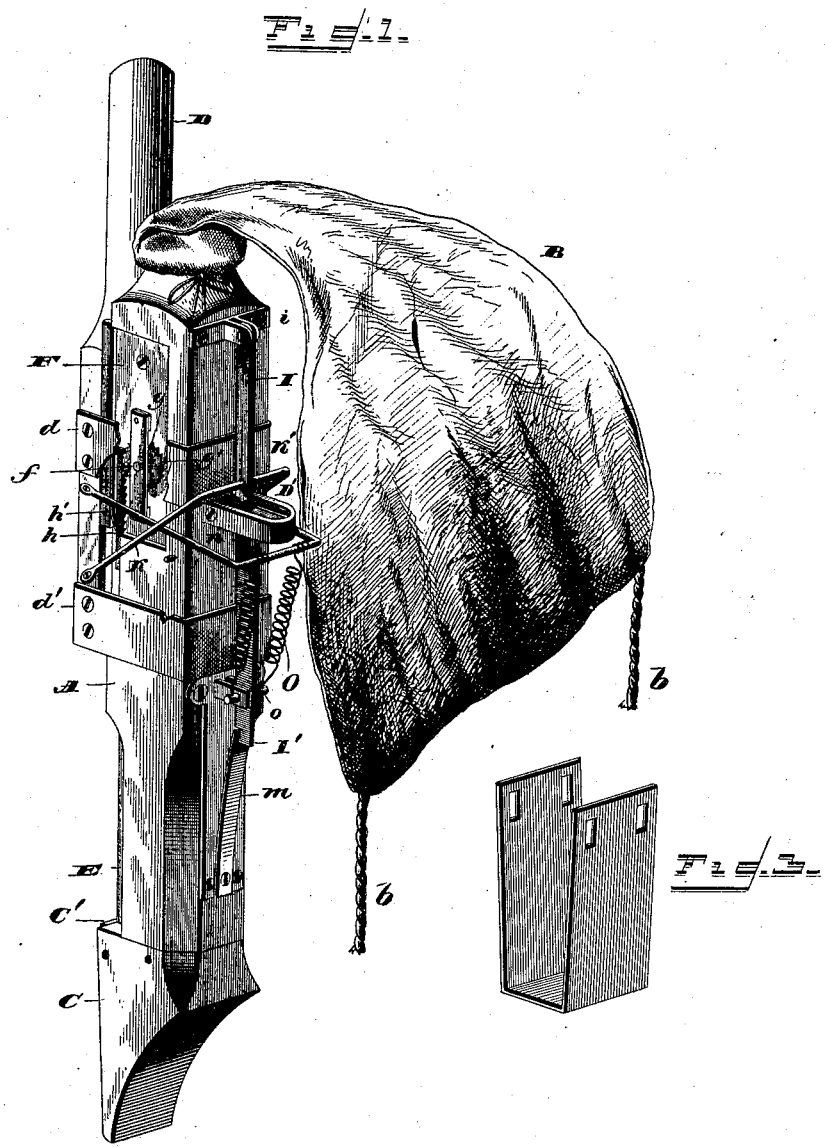
WITNESSES
Ezekiel J. Hamby.
INVENTOR
Attorney

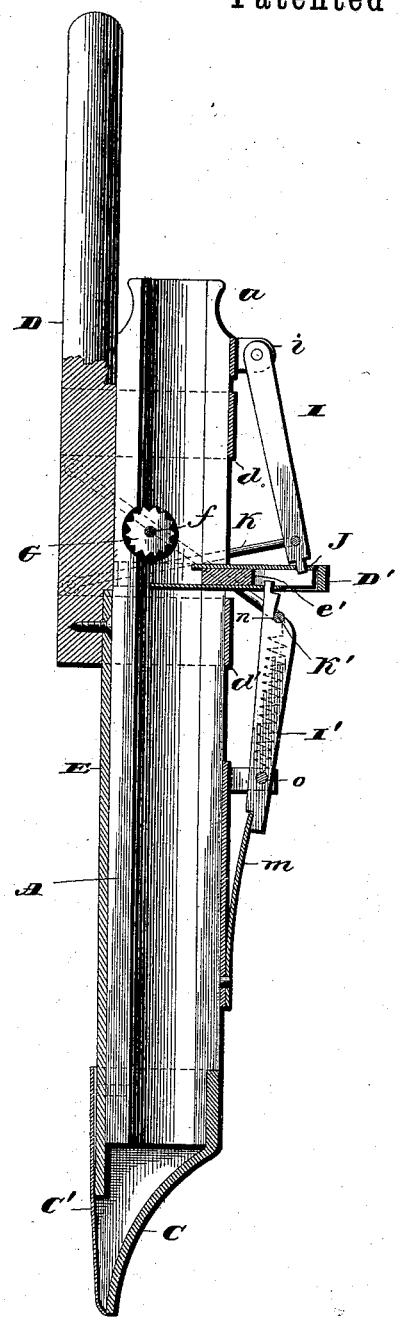

UNITED STATES PATENT OFFICE.

EZEKIEL J. HAMBY, OF EMPIRE, KENTUCKY.

HAND CORN-PLANTER.

SPECIFICATION forming part of Letters Patent No. 375,286, dated December 20, 1887.

Application filed September 29, 1887. Serial No. 251,059. (No model.)

*To all whom it may concern:*

Be it known that I, EZEKIEL J. HAMBY, a citizen of the United States of America, residing at Empire, in the county of Christian and State of Kentucky, have invented certain new and useful Improvements in Hand Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in hand corn-planters; and it consists in the construction and combination of the parts, as will be hereinafter fully set forth, whereby I provide a planter which can be easily carried, the handle thereof being adapted to slide upon the body portion, so that the weight of the body portion will cause the same to slide upon the handle, said handle, when depressed, operating the seed-slides, so that the grain will be discharged into the lower central part of the body portion to be dropped in the hill, as will be hereinafter fully set forth.

In the accompanying drawings, which illustrate my invention, Figure 1 is a perspective view of a hand corn-planter constructed in accordance with my invention. Fig. 2 is a central vertical section thereof; and Fig. 3 is a detail perspective view of a shield, which can be attached to the shoe or lower end of the planter when it is desired to drop seed or fertilizer upon the surface of the ground.

The hereinafter-described device is adapted to be used either for planting corn or other seed or distributing fertilizers; or the fertilizer and seed may be dropped simultaneously.

A refers to the body portion of my improved hand-planter, which is provided with a central opening, through which the seed passes from a suitably-constructed bag or other receptacle, B, to the shoe C, which is securely attached to the lower end of the body portion A. The bag or receptacle B is preferably funnel-shaped, the small end being provided with a drawing-string, so that it can be conveniently attached and detached from the upper end of the body portion A, which is provided with a circumferential groove, $a$. The opposite end of the bag is provided with a cord or strap, $b$, which is adapted to be passed over the shoulder of the person operating the hand-planter.

D refers to the sliding handle, which is connected to the body portion by straps $d$ and $d'$, the lower strap being notched on one side, so as to engage with a projecting pin, which extends outwardly from the body portion to limit the upward movement of the handle, the downward movement being limited by the upper strap, $d$, contacting with the outwardly-projecting frame D'. To the lower end of the handle is rigidly attached a sliding bar, E, which extends downwardly, so as to reach the point or lower end of the shoe when the handle is depressed to its full extent.

The shoe C, which is rigidly attached to the lower end of the body portion, is opened on one side, within which opening the bar E slides, and abreast of said opening is attached a spring-plate, C', the lower end of which may be slightly curved inwardly. This spring-plate is attached to the shoe by screws, which also serve to hold the shoe upon the body portion.

Near the upper end of the body portion A one of the sides thereof is recessed for the reception of a plate, F, which plate projects slightly over one edge of the body portion, the inner edge of the handle being recessed for this projecting edge, which is of greater thickness than the body of the plate.

The plate F, near its center, is provided with a bearing for a shaft, $f$, which shaft extends through the body portion A of the planter, and is mounted so as to intersect the longitudinal opening in said body portion A, and to it is secured a serrated disk, G. To the end of the shaft adjacent to the plate F is rigidly secured a ratchet-wheel, $g$, above which is a plate that partially covers said ratchet-wheel. This ratchet-wheel engages with a spring-pawl, $g'$, which will only permit the rotation of the same in one direction.

To the strap $d$, which serves as a guide for the handle, is pivotally attached a ratchet-bar, $h$, that is held in contact with the ratchet-wheel $g$ by a spring, $h'$, the teeth on the bar and wheel being so arranged with relation to each other that when the handle is depressed the ratchet-bar will move over the ratchet-wheel without operating the same; but when the handle is raised the teeth of the bar will engage with those of the ratchet-wheel, so as to turn the same and the serrated disk G, which is mounted on the same shaft.

Near the upper end of the body portion is attached a bracket, $i$, to which is pivoted an arm, I, the lower end of said arm engaging with an opening in the end of a sliding plate, J. A bail, K, also passes through this arm I, the ends thereof extending across the sides of the body portion and are pivoted to the sliding handle. The slotted block $e'$ is secured within the frame D', and is held adjustably therein by screws, and within the slot the lower end of the arm I and the upper end of the arm I', which is pivoted beneath the same, may move.

I' refers to an arm which is pivoted to a suitable bracket, which bracket carries a spring, $m$, engaging with the notched end of the arm I', to normally throw the same outwardly, and the upper end of this arm has a notch, $n$, with which the bail K' engages, said bail crossing the bail K, and is pivoted to the sides of the handle. To the pivot-pin $o$ of the arm I' spiral springs O are attached, the upper end of said spiral spring being secured to the bail K', so that the springs will have a tendency to draw downwardly upon the bail.

The operation of my invention is as follows: When the handle is raised, as in Fig. 2, the implement is in a position to be placed over the hill for planting, a sufficient number of seed resting upon the lower slide. When it is desired to drop the seed, the shoe is placed upon the ground at the hill and the handle is depressed, which will cause the point of the shoe to enter the ground, and further depression of the handle will cause the arm to be drawn inwardly, so as to move the slide J across the opening and at the same time will move the arm I' and the slide connected therewith outwardly. When the full limit of the movement has been reached, the arm I' will be released from the bail K', and it will spring inwardly, carrying therewith the slide, so as to prevent grain falling into the lower portion of the planter.

The grain, which was in the lower portion of the planter previous to the movement of the slide, as hereinbefore described, will be retained in the lower portion of the shoe, and will be forced out of the same into the ground when the bar E descends with the handle. When the handle is raised, which is accomplished by elevating the device by the handle, the arm I will be moved outwardly and will carry the plate J with it. The ratchet-wheel will be turned so as to actuate the disk G and keep the grain from clogging, and the bail K' will be moved so as to engage with the notch in the upper end of the arm I', so as to bring the parts again in operative position.

In planting in soft ground, a shield, as shown in Fig. 3, may be attached to the shoe C. It is desirable to attach this shield in distributing fertilizers or grain upon the surface of the ground.

I claim—

1. In a hand-planter, a body portion provided with a central opening, a sliding handle secured to said body portion and connected to arms which engage with the seed-slides, so that said seed-slides will be actuated in opposite directions by the sliding movement of the handle in one direction, substantially as shown, and for the purpose set forth.

2. In a hand-planter, a body portion having a central opening, a seed bag or receptacle attached to the upper end of said body portion, seed-slides with which pivoted arms engage, and bails connecting said seed-slides to a sliding handle, so that they will be actuated simultaneously in opposite directions by the movement of the handle in one direction upon the body portion, substantially as shown, and for the purpose set forth.

3. In a hand-planter, the combination of a sliding handle secured movably to a body portion, arms pivoted at one end to the body and connected at their free ends to bails pivoted on the sliding handle, seed-slides with which the pivoted arms engage, one of said arms being spring-actuated, so as to throw the seed-slide connected therewith inwardly when the handle is depressed, substantially as shown, and for the purpose set forth.

4. The combination, in a hand-planter, of a sliding handle which is connected to the body portion, the upper end thereof engaging with the seed-slide, a bail, having springs O O, for causing the same to engage with a notch in the upper end of the pivoted arm, and a spring, $m$, for throwing said pivoted arm and the seed-slide inwardly, substantially as shown, and for the purpose set forth.

5. In a hand-planter, the combination of a body portion, A, provided with a central opening, a sliding handle, having bails K and K', pivoted arms I and I', connected to seed-slides, one of said arms being spring-actuated, a spring, O, for causing the engagement of the bail K' with the notched end of the arm I', a bar, E, connected to the handle, and a spring-plate, C', operated thereby, the parts being organized, substantially as shown, and for the purpose set forth.

6. The combination, in a hand-planter constructed substantially as shown, of a body portion having a central opening, seed-slides operated by the movement of a sliding handle, a serrated plate, G, located within the opening in the body portion, the outer end of the shaft thereof having a ratchet-wheel with which a ratchet-bar carried by the handle engages for turning the serrated disk, substantially as shown, and for the purpose set forth.

In testimony whereof I affix my signature in presence of two witnesses.

EZEKIEL J. HAMBY.

Witnesses:
V. A. HAMBY,
C. A. BRASHER.